US008588803B2

(12) United States Patent
Hakola et al.

(10) Patent No.: US 8,588,803 B2
(45) Date of Patent: Nov. 19, 2013

(54) METHOD AND APPARATUS FOR RESOURCE SCHEDULING FOR NETWORK CONTROLLED D2D COMMUNICATIONS

(75) Inventors: Sami-Jukka Hakola, Kempele (FI); Gilles Charbit, Hampshire (GB); Timo Koskela, Oulu (FI); Vinh Van Phan, Oulu (FI)

(73) Assignee: Nokia Corporation, Espoo (FI)

( * ) Notice: Subject to any disclaimer, the term of this patent is extended or adjusted under 35 U.S.C. 154(b) by 66 days.

(21) Appl. No.: 12/818,705

(22) Filed: Jun. 18, 2010

(65) Prior Publication Data
US 2011/0312331 A1 Dec. 22, 2011

(51) Int. Cl.
*H04W 24/00* (2009.01)
(52) U.S. Cl.
USPC .............. 455/452.2; 370/310.2; 370/328; 370/329; 370/332; 370/334; 455/41.2; 455/422.1; 455/450; 455/452.1; 455/456.2
(58) Field of Classification Search
USPC .......... 370/329, 310, 310.2, 328, 332, 333, 370/334; 455/452.1, 41.2, 422.1, 450, 455/456.2, 456.5, 456.6, 463, 464, 500, 455/509, 513, 517
See application file for complete search history.

(56) References Cited

U.S. PATENT DOCUMENTS

| 7,308,266 B2 | 12/2007 | Du et al. |
| 7,333,824 B2 | 2/2008 | Zhang et al. |
| 2005/0239451 A1 | 10/2005 | Periyalwar et al. |
| 2005/0254449 A1 | 11/2005 | Halfmann et al. |
| 2006/0140115 A1* | 6/2006 | Timus et al. .................. 370/230 |
| 2007/0104123 A1 | 5/2007 | Tomici et al. ................. 370/310 |
| 2007/0109989 A1 | 5/2007 | Nakagawa et al. |
| 2007/0116007 A1* | 5/2007 | Xiao et al. ................. 370/395.4 |
| 2007/0183373 A1 | 8/2007 | Gao et al. |
| 2009/0325625 A1 | 12/2009 | Hugl et al. |
| 2010/0189048 A1* | 7/2010 | Baker et al. ................. 370/329 |
| 2011/0075612 A1* | 3/2011 | Guo et al. ..................... 370/329 |

FOREIGN PATENT DOCUMENTS

| EP | 2012443 A2 | 1/2009 |
| WO | 2005060182 A1 | 6/2005 |
| WO | 2006067683 A2 | 6/2006 |
| WO | 2007034428 A2 | 3/2007 |

(Continued)

OTHER PUBLICATIONS

Sesia et al., "LTE, The UMTS Long Term Evolution: From Theory to Practice", Wiley, Apr. 13, 2009, ISBN: 0470697164, pp. 290-291.

(Continued)

*Primary Examiner* — Wesley Kim
*Assistant Examiner* — Dinh P Nguyen
(74) *Attorney, Agent, or Firm* — Harrington & Smith

(57) ABSTRACT

In accordance with an example embodiment of the present invention, a method comprises obtaining at a network node a scheduling reference point with a fluctuation range based at least in part on at least one metric for a plurality of cellular user equipments (UEs) and at least a pair of device-to-device (D2D) UEs; signaling the scheduling reference point and the fluctuation range to the at least pair of D2D UEs; allocating radio resources to the pair of D2D UEs according to one or more allocation criteria; receiving metrics updates from the pair of D2D UEs and the plurality of cellular users; and adjusting the scheduling reference point and the fluctuation range according to the received metric updates.

21 Claims, 6 Drawing Sheets

(56) References Cited

FOREIGN PATENT DOCUMENTS

| WO | WO-2007/034428 A2 | 3/2007 |
|----|-------------------|--------|
| WO | 2009044335 A1 | 4/2009 |
| WO | 2010028690 A1 | 3/2010 |
| WO | 2010049801 A1 | 5/2010 |

OTHER PUBLICATIONS

R1-082813, "M2M Communications", Alcatel-Lucent, 3GPP RAN1#54, Aug. 18-22, 2008.

R1-083850, "M2M Communications", Alcatel-Lucent, 3GPP RAN1#54bis, Sep. 29-Oct. 3, 2008.

3GPP TS 36.331, v8.2.0, "EUTRAN Radio Resource Control", Jun. 2010.

3GPP TS 36.321, v8.2.0, "EUTRAN Medium Access Control", Jun. 2010.

3GPP TS 36.211, v8.2.0, "Physical channel and modulation", Mar. 2010.

Ekstrom et al., "Solution for the 3G Long-term Evolution," IEEE Communications Magazine, vol.44, No. 3, pp. 2432-2455, Mar. 2006.

International Search Report and Written Opinion, received in corresponding Patent Cooperation Treaty Application No. PCT/IB2011/052143, dated Oct. 3, 2011, 11 pages.

Hyukjin, Lee, "Cluster-Based Multi-Channel Scheduling Algorithms for Ad Hoc Networks", Wireless and Optical Communications Networks, 2007. WOCN '07. IFIP International Conference on, pp. 1-5, Jul. 2-4, 2007.

Le et al., "Cluster-Based Multi-Channel Scheduling Algorithms for Ad Hoc Networks", Wireless and Optical Communications Networks, 2007. WOCN '07 IFIP International Conference on, pp. 1-5, Jul. 2007.

International Search Report and Written Opinion of the International Searching Authority for PCT/IB2009/007270, dated Feb. 16, 2010, pp. 1-13.

International Search Report and Written Opinion of the International Searching Authority for PCT/IB2009/050163, dated Nov. 5, 2009, pp. 1-12.

Janis et al., "Device-to-Device Communication Underlaying Cellular Communications Systems," Int. J. Communications, Network and System Sciences, 2009, 3, 169-247.

\* cited by examiner

METHOD AND APPARATUS FOR RESOURCE SCHEDULING FOR NETWORK CONTROLLED D2D COMMUNICATIONS

TECHNICAL FIELD

The present application relates generally to an apparatus and a method for resource scheduling for network controlled D2D communications.

BACKGROUND

It is not uncommon to integrate new network topologies into an existing cellular network in order to support different modes of communications and accommodate different applications. One example of the integrated network is the heterogeneous network combining macros, micros, picos, femtos and relay network technologies into a long-term evolution (LTE) or LTE-advanced (LTE-A) network all sharing the same frequency spectrum. Another example is to allow device to device (D2D) communication between two cellular user equipments (UEs) operating in the cellular system when the communicating UEs are sufficiently close to each other to use the cellular radio resources in an efficient manner. As an application example of the D2D UEs integrated into a cellular network, the D2D communication may take on characteristics of machine-to-machine (M2M) communication where the machines communicate directly with each other under supervision of a cellular network, sharing the radio resources with cellular users.

SUMMARY

Various aspects of the invention are set out in the claims.

In accordance with an example embodiment of the present invention, a method comprises obtaining at a network node a scheduling reference point with a fluctuation range based at least in part on at least one metric for a plurality of cellular user equipments (UEs) and at least a pair of device-to-device (D2D) UEs; signaling the scheduling reference point and the fluctuation range to the at least pair of D2D UEs; allocating radio resources to the pair of D2D UEs according to one or more allocation criteria; receiving metrics updates from the pair of D2D UEs and the plurality of cellular users; and adjusting the scheduling reference point and the fluctuation range according to the received metric updates.

In accordance with an example embodiment of the present invention, an apparatus comprises at least one processor; and at least one memory including computer program code. The at least one memory and the computer program code are configured to, with the at least one processor, cause the apparatus to perform at least the following: obtaining a scheduling reference point with a fluctuation range based at least in part on at least one metric for a plurality of cellular user equipments (UEs) and at least a pair of device-to-device (D2D) (UEs); signaling the scheduling reference point and the fluctuation range to the at least pair of D2D UEs; allocating radio resources to the pair of D2D UEs according to one or more allocation criteria; receiving metrics updates from the pair of D2D UEs and the plurality of cellular users; and adjusting the scheduling reference point and the fluctuation range according to the received metric updates.

In accordance with another example embodiment of the present invention, a method comprises receiving at a D2D UE a scheduling reference point with a fluctuation range from a network node that supports both D2D UEs and cellular UEs; collecting achieved metrics for one or more resources allocated to the D2D UE during an active D2D communication session; sending to the network node the collected metrics; and requesting radio resources based on the scheduling reference point and the fluctuation range.

BRIEF DESCRIPTION OF DRAWINGS

For a more complete understanding of example embodiments of the present invention, reference is now made to the following descriptions taken in connection with the accompanying drawings in which.

DETAILED DESCRIPTION

Disclosed herein is a method for enabling resource allocation for D2D UEs in a cellular network with minimal signaling between the D2D UEs and the base station. The method uses a scheduling reference point and a fluctuation range to achieve fair resource scheduling and allocation among cellular UEs and D2D UEs with minimal signaling.

An example embodiment of the present invention and its potential advantages are best understood by referring to FIGS. 1 through 6 of the drawings, like numerals being used for like and corresponding parts of the various drawings.

Figure 1:
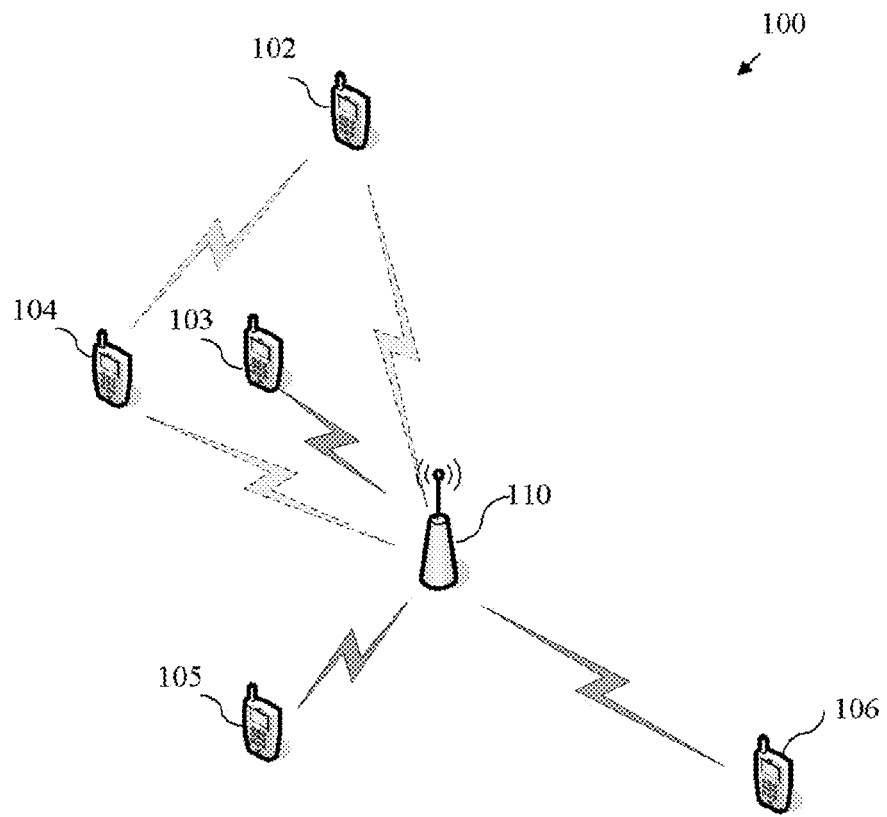
FIG. 1 illustrates an example wireless system that supports resource scheduling for network controlled D2D communication in accordance with an example embodiment of the invention.

FIG. 1 illustrates an example wireless system 100 that supports fair scheduling for network controlled D2D communication in accordance with all example embodiment of the invention. The wireless system 100 includes a set of user equipments (UEs) 102 through 106 and a base station 110 which in one embodiment is all LTE evolution node B (eNB). The UEs are connected with each other or to the base station 110 in different modes. For example, the UEs 102 and 104 operate in dual modes and are connected to each other in a D2D communication mode and to the base station 110 in a cellular mode at the same time. The other UEs including UEs 103, 105 and 106 are connected to the base station 110 in a signaling mode.

In one example embodiment, the UEs 102 and 104 come into vicinity of each other and a D2D mode communication session may be triggered. For example, the UEs 102 and 104 may come to a conference room to join a meeting. In one embodiment, the base station 110 detects that two communicating UEs 102 and 104 are within the range of D2D communication, allocate the D2D resources for the UEs and initiate a session setup for a D2D connection between the UEs 102 and 104. In an alternative embodiment, the UE 102 and the UE 104 may become aware of the presence of each other when they come to the conference room and initiate a session setup on their own to use the licensed cellular radio resource for the D2D session. In either case, the base station 110 may allocate the cellular resource to the UE 102 and 104, as well as to other UEs including the UEs 103, 105 and 106.

In one example embodiment, the base station 110 defines a reference point and a fluctuation range for the UEs 102 and 104. The reference point may specify a performance metric such as throughput, an error bit rate, and the like and the fluctuation range may specify a point below the reference point and a point above the reference point to give the UEs a flexible range for resource request. The base station 110 may decide the reference point and the fluctuation range based on available resource, a number of active users in the cell, QoS class to which the UE 102 and 104 belong, and other criteria. The base station may signal the reference point and the fluctuation range to the UEs 102 and 104 via a standard signaling protocol. The UEs 102 and 104 may request resource based on the received reference point and fluctuation range, thus avoiding repeated signaling between the base station 110 and the UEs 102 and 104, and also ensuring a level of fairness of resource allocation among the UEs 102 through 106.

It may not be practical for the UEs 102 and 104 to engage simultaneous transmission to the eNB 110 and to each other or other devices on uplink due to different transmission power levels and possible reuse of the same radio resources among multiple D2D pairs or with a cellular user. Thus when a D2D UE is transmitting to the eNB, D2D connection may not be used and the efficiency of the D2D communication may decrease linearly as a function of amount of communication with the eNB. As transmission between the UEs 102 and 104 need feedback signaling between themselves, the UEs 102 and 104 may decide how assigned resources are shared in a distributed fashion without any eNB involvement. This may be desirable in case of the D2D cluster operation in which the cluster comprises more than two locally communicating devices or UEs. Thus minimizing the amount of signaling between the UEs 102 and 104 and the base station 110 may significantly facilitate communications in a D2d cluster environment.

Figure 2:
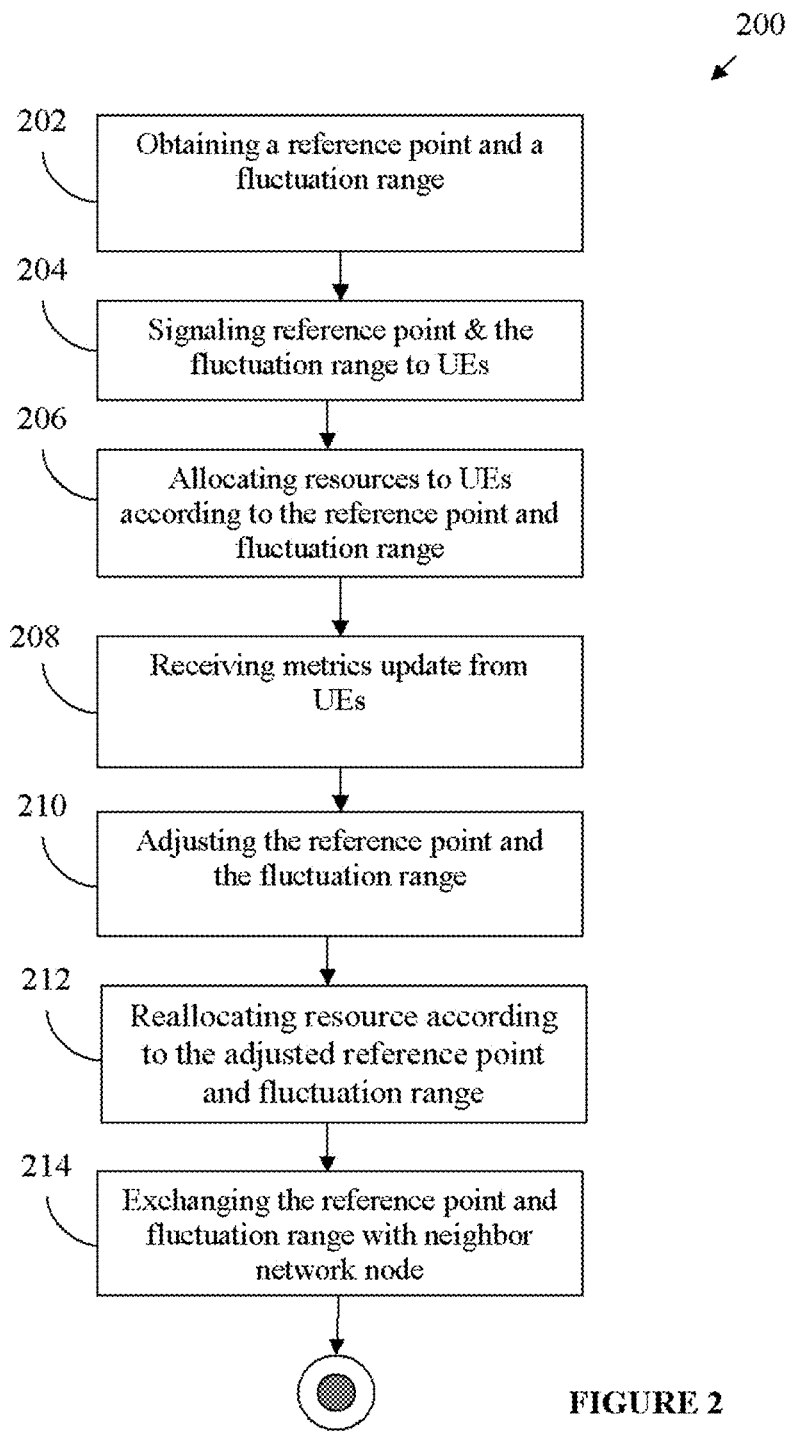
FIG. 2 illustrates an example method for resource scheduling at a network node in accordance with an example embodiment of the invention.

FIG. 2 illustrates an example method 200 for fair scheduling of cellular resource for D2D UEs at a network node in accordance with an example embodiment of the invention. The method 200 may include obtaining a reference point and fluctuation range at block 202, signaling the reference point and the fluctuation range at block 204 and allocating resource at block 206. The method 200 may also include receiving metric updates from UEs at block 208, adjusting the reference point and the fluctuation range at block 210, reallocating resources according to the adjusted reference point at block 212 and exchanging reference point with neighbor network node at block 214.

In one example embodiment, obtaining a reference point and fluctuation range at block 202 may include setting the reference point, also termed a scheduling reference point, and the fluctuation range based on one or more criteria. The example criteria may include a fairness criterion between the cellular UEs and the D2D UEs, a criterion of minimizing signaling between D2D UEs and the network node, a criterion of maximizing number of cellular UEs and D2D UEs in a cell at same time, and a quality of service (QoS) criterion for a QoS class of UEs. Obtaining the reference point and fluctuation range at block 202 may include setting the fluctuation range based on a current network condition, available resource, a current QoS class, and a priority of the network condition. The reference point may be a target error bit rate, a target delay, a target throughput, a desired transmission power, or a combination of the above. The fluctuation range may specify a range around the reference point, including a point above the reference and a point below the reference point in term of percentage points.

In one example embodiment, signaling the reference point and the fluctuation range at block 204 may include either broadcasting the reference point and the fluctuation range to the devices within the cell or sending the reference point and the fluctuation range to specific UEs via a point-to-point connection. The reference point and fluctuation range may be specific to a QoS class of UEs, a pair of UEs or cell-wide UEs.

In one example embodiment, allocating resource at block 206 may include allocating resources to newly arrived UEs based on fairness criteria, available resources and other criteria. The fairness criterion may be based on policy consideration for cellular UEs and the D2D UEs, QoS class to which each UE belongs, and the like. In one example embodiment, receiving metrics updates from UEs at block 208 may include receiving metrics from the UEs on a fixed interval or on demand. The metrics update may include achieved error bit rate, delay, throughput, a transmission power and the like for a fixed number of intervals. The metric updates may be aggregated metrics for a QoS class of UEs, cell-wide UEs or a target pair of D2D UEs.

In one example embodiment, adjusting the reference point and fluctuation range at block 210 may include adjusting the reference point on a QoS class basis, a cell-wide basis or for specified UEs based on the received metric updates. In one example embodiment, if the received metric updates indicate that the achieved metrics are consistently under the reference point or below the lower bound of the fluctuation range, the reference point and fluctuation range may be adjusted higher, if the available resources and other criteria are met. On the other hand, if achieved metrics are consistently against the upper bound of the fluctuation range, the reference point and fluctuation range may be set lower so that the UEs may request fewer resources.

In one example embodiment, adjusting the reference point and fluctuation range at block 210 may include scheduling the signaling for reference point and the fluctuation range at physical layer of physical downlink control channel (PDCCH). This may happen when a D2D communication is moved to an unlicensed spectrum where the pair of D2D UEs still listens to PDCCH on the licensed spectrum on downlink during a D2D communication on unlicensed spectrum. In one example embodiment, adjusting the reference point and fluctuation range at block 210 may include setting the fluctuation range to zero to result in a full scheduling of D2D transmission resources by the network node and no autonomous resource allocation by the D2D pair of UEs. In one example embodiment, adjusting the reference point and fluctuation range at block 210 may also include adjusting the amount of control signaling related to the scheduling based on different fluctuation range parameter values. For example, a finer fluctuation range may need more signaling and a wider fluctuation range may need less amount of signaling between the D2D UEs and the base station.

In one example embodiment, reallocating resources according to the adjusted reference point at block 212 may include reallocating resources to all UEs in the cell, a QoS class of UEs, or targeted pair of D2D UEs or cellular UEs. The reallocation of resource may be triggered by a variety of the events, such as a large increase or decrease of number of active users in the cell, major changes of resource use patterns by active users, new arrival UEs, and the like.

In one example embodiment, exchanging the reference point with neighbor network node at block 214 may include exchanging the reference points and fluctuation range with a neighbor eNB over a node-to-node interface such as an X2 interface of 3rd Generation Partnership Project (3GPP) to either align reference points for coordination of resource allocation or to facilitate mobility management. For example, the reference points may be used for mobility of the D2D pair locating in the cell border of two neighboring eNBs in such way that when the D2D UEs are handed over into a new cell, the expected reference point is already known to the D2D UEs and only a minimal amount of signaling exchanges with the new eNB may be needed.

Figure 6:
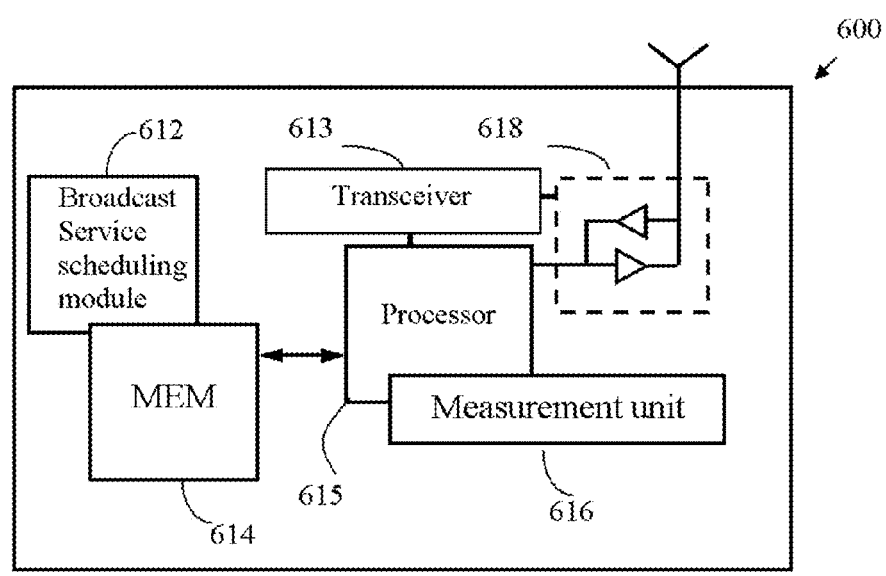
FIG. 6 illustrates an example wireless apparatus in accordance with an example embodiment of the invention.

In one example embodiment, the method 200 may be implemented at the base stations 110 of FIG. 1 or by the apparatus 600 of FIG. 6. The method 200 is for illustration only and the steps of the method 200 may be combined, divided, or executed in a different order than illustrated, without departing from the scope of the invention of this example embodiment.

Figure 3:
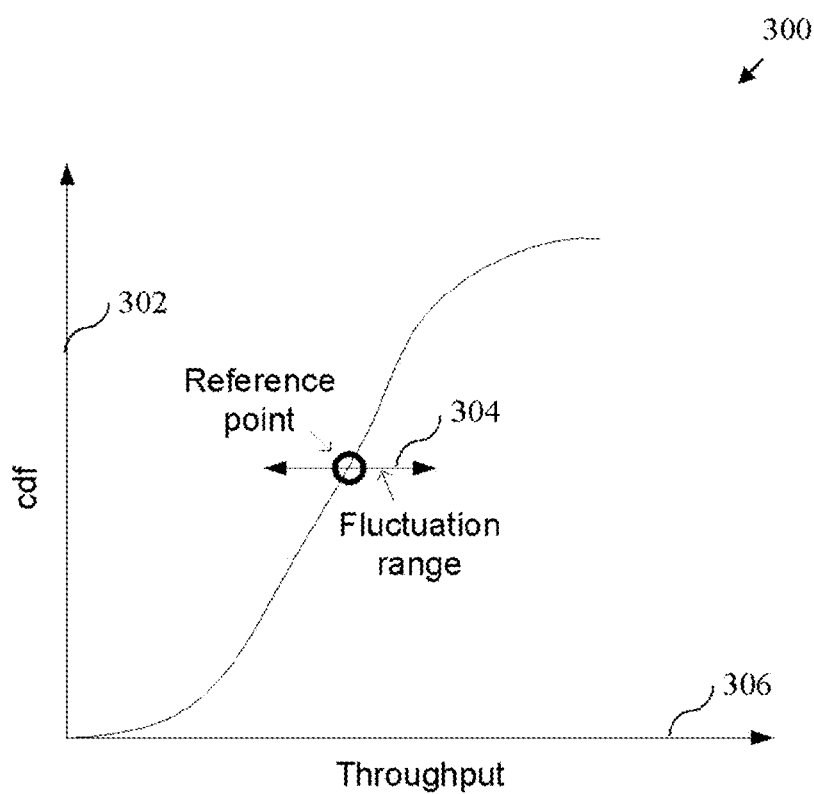
FIG. 3 illustrates an example graph for reference point and fluctuation range in accordance with all example embodiment of the invention.

FIG. 3 illustrates an example cumulative distribution function (CDF) graph 300 for a reference point and a fluctuation range in accordance with an example embodiment of the invention. The example graph 300 has an x-axis 306 representing throughput as the reference point, and y-axis 302 representing a cumulative distribution function. The throughput as the example reference point may be for a service bearer, a group of resources or other resource unit. The fluctuation range 304 is also defined in the unit of throughput that centers on the reference point. The reference point may be set by an eNB which may keep track of statistics of achieved average throughput of all cellular users or a subset of the cellular or D2D UEs of the uplink within the cell. In one example embodiment, the eNB may form a CDF graph of the throughputs for each QoS class. The eNB may also use different or same metric as the reference point for other groups of UEs.

Figure 4:
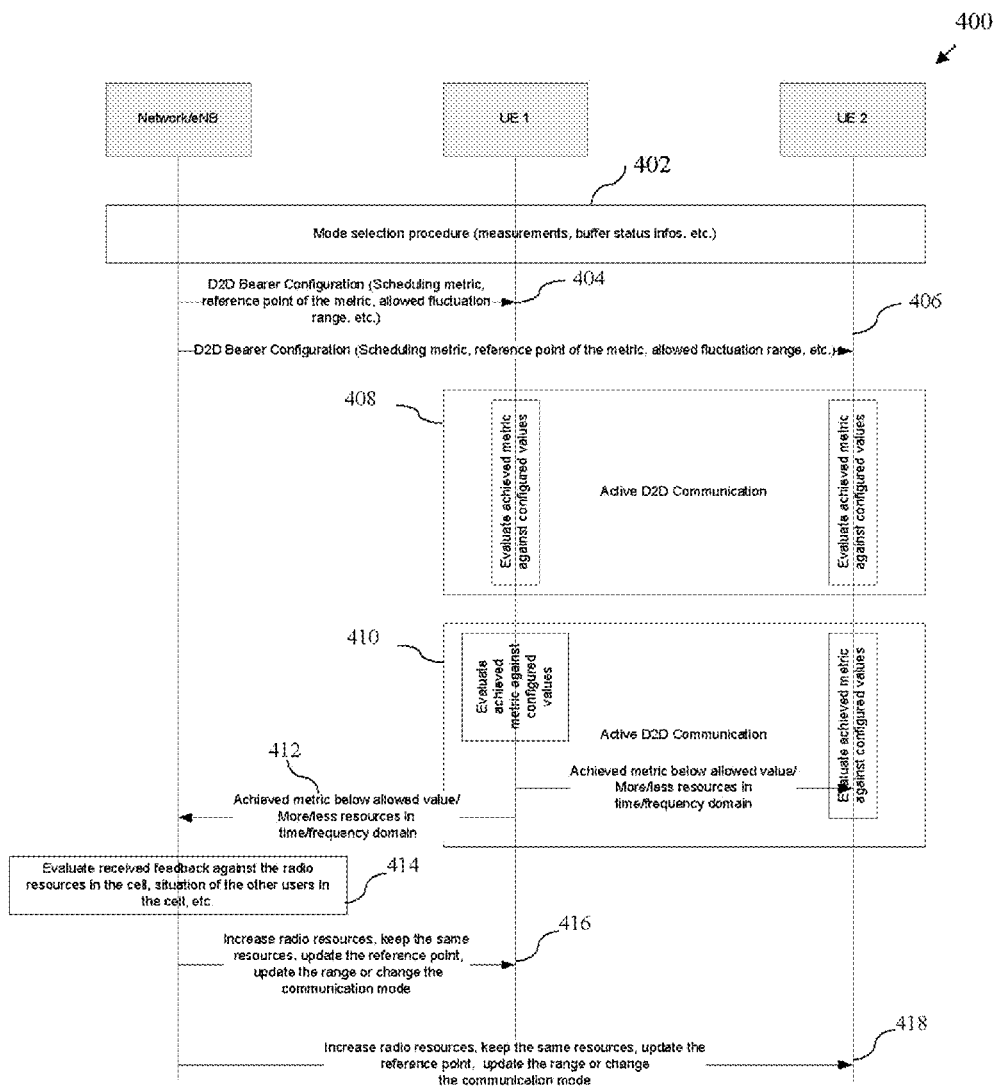
FIG. 4 illustrates an example flowchart for signaling between a network node and a pair of D2D UEs in accordance with an example embodiment of the invention.

FIG. 4 illustrates an example flowchart 400 for signaling between a network node and a pair of D2D UEs in accordance with an example embodiment of the invention. The signaling message exchanges involve two UEs, UE1 and UE2 and an eNB base station. Prior to the signaling procedure, there is a mode selection procedure at the step 402 for the pair of UEs to select a communication mode such as the cellular mode or the D2D mode based on measurements, buffer status and the like.

In one example embodiment, at steps 404 and 406, the eNB may send bearer configuration information to UE1 and UE2 respectively via a resource configuration message and include in the resource configuration message are one or more scheduling metrics, a reference point and a fluctuation range. At step 408 and step 410, UE1 and UE2 may collect their respective achieved metrics, and exchange the achieved metrics between the two UEs. One of the UEs may aggregate the achieved metrics and have a collective view of the achieved metrics over a specified period of time. At step 412, UE1 may send a resource request based on the aggregated achieved metrics to both UE2 and the eNB. If the achieved metrics is below that allowed by the reference point and fluctuation range, UE1 may request more than allocated resource.

In one example embodiment, the eNB may reallocate the radio resources at step 414, upon receiving the achieved metrics and other feedbacks from the UEs in the cell, based on the received requests, achieved metrics and the current view of available resources. The eNB may also adjust the reference point and fluctuation range for individual UEs, a QoS class of UEs or cell-wide UEs. At steps 416 and 418, based on the newly allocated resources and adjustment of the reference point and the fluctuation range, the eNB may instruct UE1 and UE2 to take one or more actions which may include increasing, decreasing, or keeping same the allocated resources. The eNb may also send the updated reference point and the fluctuation range to the UEs. Alternatively if the available radio resources are not adequate to support the D2D mode of communication or for some other reasons, the eNB may switch the UEs to cellular mode of communication.

Figure 5:
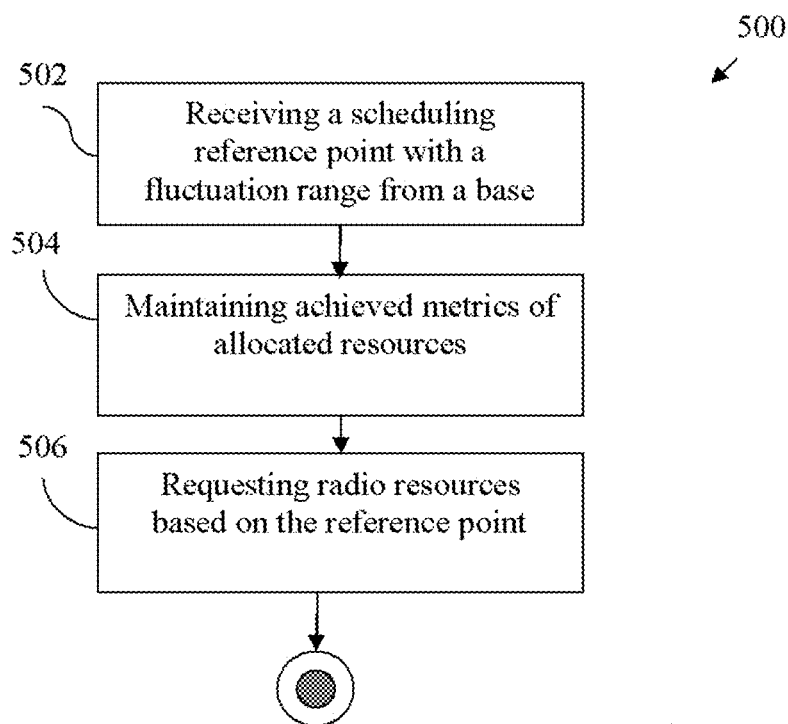
FIG. 5 illustrates an example method for requesting resources at a UE in accordance with an example embodiment of the invention.

FIG. 5 illustrates an example method 500 for requesting resources based on a reference point and fluctuation range in accordance with an example embodiment of the invention. The method 500 may include receiving a reference point with a fluctuation range at block 502, maintaining achieved metrics of allocated bearers at block 504, and requesting radio resources based on the reference point and the fluctuation range at block 506.

In one example embodiment, receiving a scheduling reference point with a fluctuation range at block 502 may include receiving at a UE the reference point and fluctuation range from an associated base station when the UE first enters a cell or when the UE initiates a process to establish the D2D session with a neighbor UE. The reference point defines a target metric such as a data throughput, an error bit rate, a transmission power, and the like and the fluctuation range defines a flexibility range around the reference point.

In one example embodiment, maintaining achieved metrics of the allocated bearers at block 504 may include collecting performance metrics on a per bearer basis or on the basis of a group of bearers and aggregating the metrics to arrive at average metrics. In one embodiment, multiple metrics may be monitored and collected at a fixed interval or on demand.

In one example embodiment, requesting radio resources based on the reference point at block 506 may include requesting less resource if an achieved metric is greater than the metric targeted by the eNB based on the reference point and fluctuation range. In one example embodiment, requesting radio resources based on the scheduling reference point at block 506 may include requesting more resources if the achieved metric of an allocated bearer is significantly less than the target metric of the reference point and fluctuation range. In such a case, the pair of D2D UEs may request additional resources according to various factors such as the magnitude of difference between the achieved metric and the target metric. In one example embodiment, the D2D UE may request the radio resources using a feedback channel.

In one example embodiment, the method 500 may be implemented at either of the UEs 102 or 104 of FIG. 1. The method 200 is for illustration only and the steps of the method 500 may be combined, divided, or executed in a different order than illustrated, without departing from the scope of the invention of this example embodiment.

FIG. 6 illustrates an example wireless apparatus in accordance with an example embodiment of the invention. In FIG. 6, the wireless apparatus 600 may include a processor 615, a memory 614 coupled to the processor 615, and a suitable transceiver 613 (having a transmitter (TX) and a receiver (RX)) coupled to the processor 615, coupled to an antenna unit 618. The memory 614 may store programs such as a resource scheduling module 612. The wireless apparatus 600 may be at least part of a generic $4^{th}$ generation base station, or an LTE compatible base station.

The processor 615 or some other form of generic central processing unit (CPU) or special-purpose processor such as digital signal processor (DSP), may operate to control the various components of the wireless apparatus 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

In an example embodiment, the resource scheduling module 612 may be configured to obtain a reference point with a fluctuation range based at least on scheduling metrics for uplink traffic for a plurality of cellular users at a base station to which at least a pair of D2D devices are connected and to signal the scheduling reference point and the fluctuation range to the at least pair of D2D devices. The resource scheduling module 612 may also be configured to allocate radio resources to the pair of D2D devices according to one or more resource allocation criteria, receive metrics updates from the pair of D2D devices; and adjust the scheduling reference point and the fluctuation range according to newly received scheduling metrics.

In one example embodiment, the transceiver 613 is for bidirectional wireless communications with another wireless device. The transceiver 613 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 613, portions of the antenna unit 618, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 618 may be provided to convert between wireless signals and electrical signals, enabling the wireless apparatus 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 618 may include antenna tuning and/or impedance matching components, RF power amplifiers, and/or low noise amplifiers.

As shown in FIG. 6, the wireless apparatus 600 may further include a measurement unit 616, which measures the signal strength level that is received from another wireless device, and compare the measurements with a configured threshold. The measurement unit may be utilized by the wireless apparatus 600 in conjunction with various exemplary embodiments of the invention, as described herein.

In general, the various exemplary embodiments of the wireless apparatus 600 may include, but are not limited to, part of a base station, an access point or a wireless device such as a portable computer having wireless communication capabilities, Internet appliances permitting wireless Internet access and browsing, as well as portable units or terminals that incorporate combinations of such functions. In one embodiment, the wireless apparatus 600 may be implemented in the base station 110 of FIG. 1.

Without in any way limiting the scope, interpretation, or application of the claims appearing below, a technical effect of one or more of the example embodiments disclosed herein is to allow an eNB to implement desired fair resource allocation among cellular and D2D users within a cellular cell. Another technical effect is a flexibility in weighing QoS of either cellular or D2D users in resource allocation. Yet another technical effect is to minimize amount of signaling between the eNB and the D2D UEs via a reference point and a fluctuation range parameters.

Embodiments of the present invention may be implemented in software, hardware, application logic or a combination of software, hardware and application logic. The software, application logic and/or hardware may reside on a base station, an access point or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defiled in the appended claims.

What is claimed is:

1. A method, comprising
obtaining at a network node a scheduling reference point with a fluctuation range based at least in part on at least one metric for a plurality of cellular user equipments and at least one pair of device-to-device user equipments, the scheduling reference point being at least one of a bit error rate, a data-block error rate, a packet loss rate, a delay, a throughput, and a transmission power, and the fluctuation range centers on the scheduling reference point and includes an upper bound and a lower bound;
signaling the scheduling reference point and the fluctuation range to the at least one pair of device-to-device user equipments;
allocating radio resources to the at least one pair of device-to-device user equipments according to one or more allocation criteria;
receiving metrics updates from the at least one pair of device-to-device user equipments and the plurality of cellular user equipments;

receiving a request for a change of radio resources from the at least one pair of device-to-deice user equipments that is determined based on the metrics updates; and adjusting the scheduling reference point and the fluctuation range according to the received metric updates.

2. The method of claim 1 further comprising reallocating radio resources based on the adjusted scheduling reference point and fluctuation range.

3. The method of claim 1 wherein obtaining the scheduling reference point with the fluctuation range further comprises setting the scheduling reference point and the fluctuation range based on one or more scheduling criteria that include a fairness criterion between the plurality of cellular user equipments and the at least one pair of device-to-device user equipments, a criterion of minimizing signaling between the at least one pair of device-to-device user equipments and the network node, and a criterion of maximizing number of cellular user equipments and device-to-device user equipments communicating at same time in a cell serviced by the network node.

4. The method of claim 1 wherein obtaining the scheduling reference point with the fluctuation range further comprises at least one of setting the fluctuation range based on a current network condition, a QoS class, a priority of the current network condition; and setting the reference point based at least on one of a target application, and a desired QoS metric.

5. The method of claim 1 wherein adjusting the scheduling reference point further comprises at least one of:

adjusting an amount of control signaling between the at least one pair of device-to-device user equipments and the network node based on different fluctuation range parameter values; and adjusting the scheduling reference point on a QoS class basis, a cell-wide basis or for a specific pair of user equipments.

6. The method of claim 1 wherein adjusting the scheduling reference point and the fluctuation range further comprises scheduling the reference point and the fluctuation range signaling at a physical layer of a physical downlink control channel (PDCCH) when a device-to-device communication session on a licensed spectrum between the at least one pair of device-to-device user equipments is moved to an unlicensed spectrum wherein the at least one pair of device-to-device user equipments still listen to the PDCCH on the licensed spectrum on a downlink during the device-to-device communication session.

7. The method of claim 1 wherein adjusting the scheduling reference point and the fluctuation range further comprises setting the fluctuation range to zero to result in a full scheduling of device-to-device transmission resources by the network node and no autonomous resource allocation by the at least one pair of device-to-device user equipments.

8. The method of claim 1 further comprising exchanging the reference point and the fluctuation range with one or more neighbor network nodes via a node-to-node interface to either align reference points or to facilitate management of mobility for the at least one pair of device-to-device user equipments locating in a cell border of two neighboring eNB nodes in such way that the at least one pair of device-to-device user equipments is handed over to a new cell with a minimal signaling on a new scheduling reference point and fluctuation range.

9. An apparatus, comprising:
at least one processor; and
at least one memory including computer program code, the at least one memory and the computer program code configured to, with the at least one processor, cause the apparatus to perform at least the following:

obtaining a scheduling reference point with a fluctuation range based at least in part on at least one metric for a plurality of cellular user equipments and at least one pair of device-to-device user equipments, the scheduling reference point being at least one of a bit error rate, a data-block error rate, a packet loss rate, a delay, a throughput, and a transmission power, and the fluctuation range centers on the scheduling reference point and includes an upper bound and a lower bound;

signaling the scheduling reference point and the fluctuation range to the at least one pair of device-to-device user equipments;

allocating radio resources to the at least one pair of device-to-device user equipments according to one or more allocation criteria;

receiving metrics updates from the at least one pair of device-to-device user equipments and the plurality of cellular user equipments;

receiving a request for a change of radio resources from the at least one pair of device-to-deice user equipments that is determined based on the metrics updates; and adjusting the scheduling reference point and the fluctuation range according to the received metrics updates.

10. The apparatus of claim 9 wherein the plurality of cellular user equipments and the at least one pair of device-to-device user equipments share a licensed frequency spectrum.

11. The apparatus of claim 9 wherein the at least one pair of device-to-device user equipments use one of a licensed band and an unlicensed band.

12. The apparatus of claim 9 wherein signaling the scheduling reference point and the fluctuation range comprises one of broadcasting the reference point to user equipments within the cell and sending the reference point and fluctuation range via a point-to-point connection.

13. The apparatus of claim 9 wherein the scheduling reference point and fluctuation range are set on a cell-wide basis and user equipment specific basis or both.

14. The apparatus of claim 9 wherein the fluctuation range comprises a percentage point above the reference point and a percentage point below the reference point.

15. A method, comprising receiving at a device-to-device user equipment a scheduling reference point with a fluctuation range from a network node that supports both device-to-device user equipments and cellular user equipments, the scheduling reference point being at least one of a bit error rate, a data-block error rate, a packet loss rate, a delay, a throughput, and a transmission power, and the fluctuation range centers on the scheduling reference point and includes an upper bound and a lower bound;

collecting achieved metrics for one or more resources allocated to the device-to-device user equipment during an active device-to-device communication session;

sending to the network node the collected metrics; and when the achieved metrics are not within the fluctuation range, requesting a change of radio resources based on the scheduling reference point and the fluctuation range.

16. The method of claim 15 wherein requesting the radio resources further comprises requesting less resources than currently allocated if the achieved metrics of the allocated resources are consistently greater than the scheduling reference point.

17. The method of claim 16 wherein requesting the radio resources further comprises requesting more resources than currently allocated if the achieved metrics of the allocated resources are consistently smaller than the scheduling reference point.

18. The method of claim 15 wherein requesting the radio resources further comprises sending a resource request using a 1-2 bit feedback channel.

19. A method, comprising obtaining at a network node a scheduling reference point with a fluctuation range based at least in part on at least one metric for a plurality of cellular user equipments and at least one pair of device-to-device user equipments;

signaling the scheduling reference point and the fluctuation range to the at least one pair of device-to-device user equipments;

allocating radio resources to the at least one pair of device-to-device user equipments according to one or more allocation criteria;

receiving metrics updates from the at least one pair of device-to-device user equipments and the plurality of cellular user equipments; and adjusting the scheduling reference point and the fluctuation range according to the received metric updates by scheduling the reference point and the fluctuation range signaling at a physical layer of a physical downlink control channel (PDCCH) when a device-to-device communication session on a licensed spectrum between the at least one pair of device-to-device user equipments is moved to an unlicensed spectrum wherein the at least one pair of device-to-device user equipments still listen to the PDCCH on the licensed spectrum on a downlink during the device-to-device communication session.

20. A method, comprising obtaining at a network node a scheduling reference point with a fluctuation range based at least in part on at least one metric for a plurality of cellular user equipments and at least one pair of device-to-device user equipments;

signaling the scheduling reference point and the fluctuation range to the at least one pair of device-to-device user equipments;

allocating radio resources to the at least one pair of device-to-device user equipments according to one or more allocation criteria;

receiving metrics updates from the at least one pair of device-to-device user equipments and the plurality of cellular user equipments; and adjusting the scheduling reference point and the fluctuation range according to the received metric updates by setting the fluctuation range to zero to result in a full scheduling of device-to-device transmission resources by the network node and no autonomous resource allocation by the at least one pair of device-to-device user equipments.

21. A method, comprising obtaining at a network node a scheduling reference point with a fluctuation range based at least in part on at least one metric for a plurality of cellular user equipments and at least one pair of device-to-device user equipments;

signaling the scheduling reference point and the fluctuation range to the at least one pair of device-to-device user equipments;

allocating radio resources to the at least one pair of device-to-device user equipments according to one or more allocation criteria;

receiving metrics updates from the at least one pair of device-to-device user equipments and the plurality of cellular user equipments;

adjusting the scheduling reference point and the fluctuation range according to the received metric updates; and exchanging the reference point and the fluctuation range with one or more neighbor network nodes via a node-to-node interface to either align reference points or to facilitate management of mobility for the at least one pair of device-to-device user equipments locating in a cell border of two neighboring network nodes so that the at least one pair of device-to-device user equipments is handed over to a new cell with a minimal signaling on a new scheduling reference point and fluctuation range.

* * * * *

UNITED STATES PATENT AND TRADEMARK OFFICE
CERTIFICATE OF CORRECTION

PATENT NO.        : 8,588,803 B2
APPLICATION NO.   : 12/818705
DATED             : November 19, 2013
INVENTOR(S)       : Sami-Jukka Hakola et al.

It is certified that error appears in the above-identified patent and that said Letters Patent is hereby corrected as shown below:

IN THE CLAIMS:

In Claim 1, Column 9, line 2, delete "device-to-deice" and replace with --device-to-device--.

In Claim 9, Column 10, line 23, delete "device-to-deice" and replace with --device-to-device--.

Signed and Sealed this
Twenty-eighth Day of January, 2014

Michelle K. Lee
*Deputy Director of the United States Patent and Trademark Office*